Patented Feb. 11, 1930

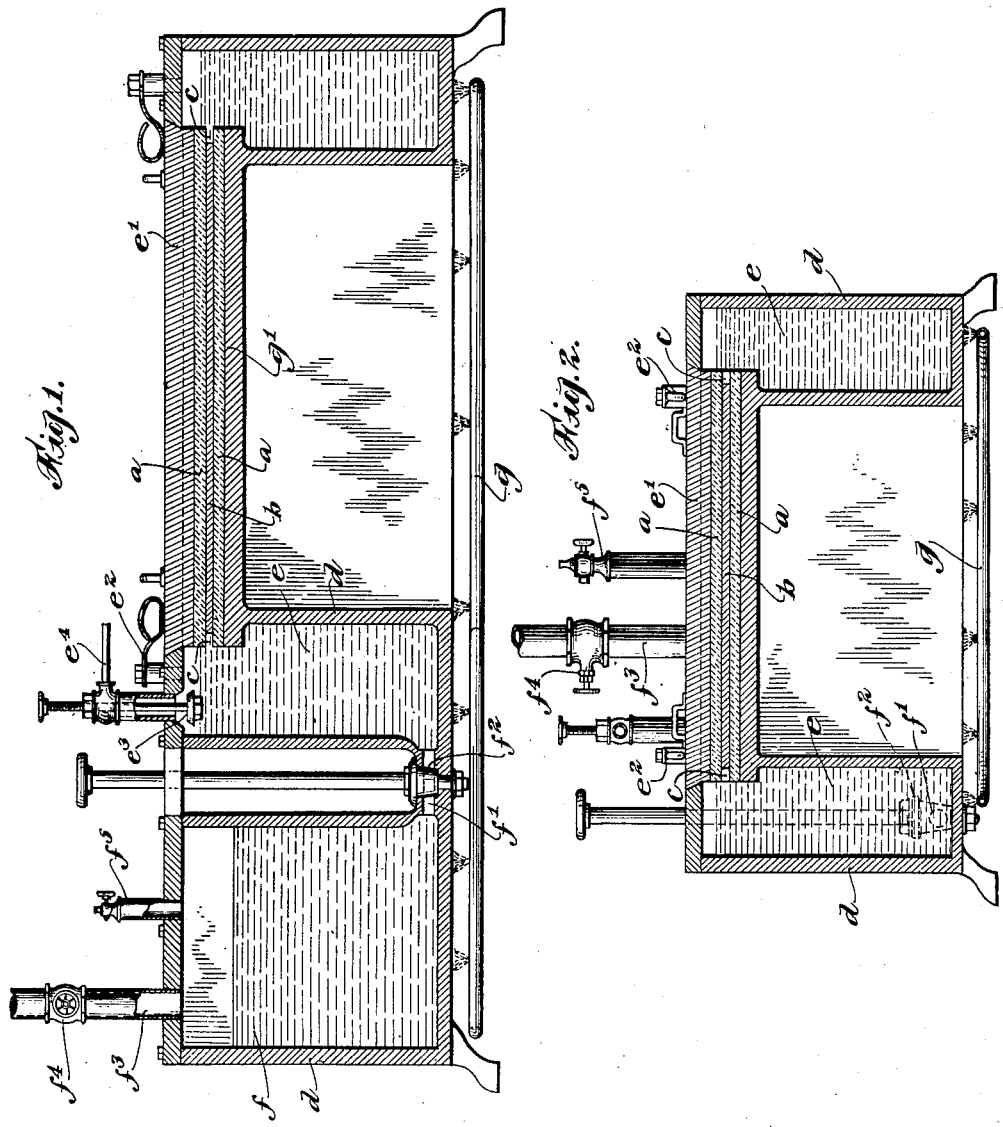

1,746,826

UNITED STATES PATENT OFFICE

THOMAS H. POWERS FARR, JR., OF NEW YORK, N. Y., ASSIGNOR TO TRIPLEX SAFETY GLASS COMPANY OF NORTH AMERICA, OF NEW YORK, N. Y., A CORPORATION OF DELAWARE

SEALING LAMINATED GLASS AND APPARATUS THEREFOR

Application filed April 3, 1928. Serial No. 266,919.

In the manufacture of laminated glass, which consists of sheets of glass with an interposed sheet of celluloid or its equivalent non-brittle material, strongly adherent to the glass on both sides, it is desirable to seal the edges of the compound sheet in order to prevent the penetration of moisture or air between the sheets of glass. The application of a coat of varnish to the edge of the compound sheet is easily accomplished but in the use of the compound sheet the varnish is sometimes worn off and air or moisture penetrates between the sheets of glass and affects unfavorably the adhesion of the celluloid to the glass. In order that the sealing may be effective and permanent it has been found desirable to clear out the space between the sheets of glass for a slight depth at the edge and to fill the sealing slot so formed with a sealing material or compound which has no action upon the celluloid or other non-brittle material and is itself unaffected by heat, moisture, air, or vibration. The object of the present invention is to provide for the rapid and effective introduction of the sealing material or compound into the sealing slot after the formation of the compound sheet has been completed and the sealing slot has been cleared out. In accordance with the invention the compound or laminated sheet, with the sealing slot cleared out, is subjected to a vacuum for the purpose of reducing as low as practicable the pressure in the sealing slot and the sealing material, maintained in a fluid condition by heat, is then permitted to fill the sealing slot, while the pressure in the slot is at a minimum, pressure being applied also to the sealing material if necessary to aid the flow of the sealing material into the slot. Under the influence of the vacuum and of the capillary action of the very thin sealing slot the sealing material fills the slot to the bottom. The character of the sealing material is such that it chills and hardens quickly by contact with the relatively cooler glass so that the glass can be removed immediately without loss of sealing material from the sealing slot. The invention will be explained more fully hereinafter with reference to the accompanying drawing in which:

Figure 1 is a view in longitudinal, vertical section, of an apparatus adapted for the practice of the method of sealing herein referred to, and Figure 2 is a view of the same in transverse section.

The compound or laminated sheet which is to be sealed is shown as consisting of two sheets $a$ of glass, with an interposed sheet of celluloid or equivalent non-brittle material which, by methods not necessary to be described herein, is made strongly adherent on both sides to the glass. When this compound or laminated sheet is in readiness for sealing it has at its edge, between the two sheets of glass, as at $c$, a recess which is called for convenience a sealing slot, formed by the omission or removal of the intersheet $b$ for a slight depth, possibly one-quarter of an inch, and quite narrow, depending upon the thickness of the celluloid or non-brittle sheet $b$.

The apparatus shown in the drawing for the practice of the method herein referred to, comprises a tank $d$ which has an enclosed sealing chamber $e$ and a supply chamber $f$ for the sealing material, which may be kept in a suitably fluid condition by a heating device $g$. Within the sealing chamber $e$, preferably near its top, is a table $g^1$ to receive the laminated sheet $a, b$, which is to be sealed at its edge. Preferably the table is at least as large as the glass to be sealed and leaves the edge of the glass exposed all around but without exposing either face of the glass. The top of the sealing chamber receives a removable lid or cover $e^1$ which fits tightly within the opening in the top and is held tightly in position by suitable clamping devices $e^2$. The lid or cover conforms in size to the table $g$ so that the upper face of the laminated sheet $a, b$ shall be completely covered as well as the lower face.

The supply chamber $f$ communicates with the sealing chamber $e$ only through a passage $f^1$ controlled by a hand operated valve $f^2$. The sealing chamber is connected through a hand controlled valve $e^3$ and a suitable connection $e^4$ with a suction device of any suitable character. The supply chamber $f$ is connected through a pipe $f^3$ and a hand controlled valve $f^4$ with a source of air under pressure. The supply chamber $f$ may also be provided with a valve controlled vent $f^5$.

In the practice of the method with the apparatus described, the lid $e^1$ having been removed and the sealing material being in a suitably fluid condition, with its level in the sealing chamber $e$ slightly below the top of the table $g$, the laminated glass is placed on the table and the lid $e^1$ is applied and secured tightly into place. Then, through the valve controlled connection $e^3$, $e^4$ the air in the sealing chamber is exhausted as far as practicable, the pressure in the sealing slot being thus reduced to a minimum. As the next step the sealing material, in its fluid condition, is permitted to enter the sealing slot. This is accomplished by opening the valve $f^2$, which controls the connection between the supply chamber and the sealing slot. The sealing material, under the influence of the vacuum, assisted, it may be, by the supply of additional pressure on the surface of the sealing material in the supply chamber $f$, floods the exposed edges of the laminated sheet and penetrates the sealing slot to the bottom, completely filling the same. The sealing material in the slot chills and hardens immediately and the fluid sealing material is allowed to resume its normal level through the closing of the exhaust valve $e^3$ and the opening of the vent $f^5$, the surface of the sealing material in the sealing chamber falling below the level of the top of the table $g$. The valve $f^2$ is then closed after which the laminated sheet is removed at once and replaced by another, the described operations being repeated in quick succession.

I claim as my invention:

1. An apparatus for sealing laminated glass with a sealing slot in its edge, which comprises a sealing chamber, a table in the sealing chamber to support the glass, means to exhaust the air from the sealing chamber and the sealing slot, and means to cause fluid sealing material to enter the sealing chamber and immerse the sealing slot.

2. An apparatus for sealing laminated glass with a sealing slot in its edge, which comprises a sealing chamber, a table in the sealing chamber to support the glass, means to exhaust the air from the sealing chamber and the sealing slot, a supply chamber for sealing material, a valve controlled connection between the supply chamber and the sealing chamber, and means to cause sealing material in a fluid state to enter the sealing chamber under pressure.

3. The method of filling with sealing material a slot in the edge of laminated glass, which comprises reducing the air pressure in the sealing slot and immersing the glass in a bath of sealing material while the pressure is still reduced.

4. The method of filling with sealing material a slot in the edge of laminated glass, which comprises subjecting the glass to a vacuum, supplying fluid sealing medium to the edge of the glass and the sealing slot while still in a vacuum, and applying pressure to the sealing material.

This specification signed this 30th day of March, A. D. 1928.

THOMAS H. POWERS FARR, Jr.